Patented Nov. 8, 1938

2,136,183

UNITED STATES PATENT OFFICE 2,136,183

PRODUCTION OF ALKYLENE OXIDES

Henry Dreyfus, London, England

No Drawing. Application December 26, 1935, Serial No. 56,232. In Great Britain January 3, 1935

10 Claims. (Cl. 260—348)

This invention relates to the production of organic compounds, and is more particularly concerned with the production of ethylene oxide and other alkylene oxides.

According to the present invention alkylene oxides are produced by the saponification of esters of unsaturated alcohols in the presence of limited quantities of water and preferably in presence of not substantially more than one molecule of water per molecule of ester. The invention is more particularly concerned with the production of ethylene oxide from vinyl acetate but includes the saponification of vinyl propionate, vinyl butyrate and allyl and other esters of unsaturated alcohols.

The saponification is preferably effected with the aid of ammonia or a strong organic base, e. g. dimethyl aniline, pyridine, trimethylamine or triethylamine. With certain amines, e. g., mono-methylamine, dimethylamine, mono-ethylamine, diethylamine, aniline and monomethyl aniline, the process may be carried out in the presence of even less water than usual and may even be effected under anhydrous conditions. Very suitably, about one molecule of base may be employed for each molecule of ester but a larger or smaller proportion of base may be used if desired.

The process, which may be carried out at superatmospheric pressure if desired, although preferably normal atmospheric pressure or even reduced pressure is employed, may be effected in the liquid or vapour phase.

For instance the vinyl acetate or other ester and water may be distilled under reflux with an organic base of suitable high boiling point, e. g. pyridine, the temperature of the reflux condenser being such that the ethylene oxide or other alkylene oxide produced distils off substantially free from water or base.

The saponification can be effected very conveniently in the vapour phase. Thus a vaporous mixture of the vinyl acetate or other ester, water and organic base may be passed through a tube or other apparatus heated to a suitable temperature. Volatile bases, for instance ammonia, trimethylamine and triethylamine are particularly suitable for use in carrying into effect this form of the invention. The tube or other form of apparatus preferably contains filling materials or surface catalysts, such as pumice, kieselguhr or silica gel and is preferably heated to a moderately high temperature, e. g., a temperature of 150 to 350° C. or more. Such a process may be effected in the presence of diluent gases or vapours and such diluent gases or vapours may be preheated and thus employed as a means of introducing heat into the reaction zone.

The vaporous products obtained by such a process may be separated as desired. For instance the alkylene oxide may be fractionally condensed whereafter the base may be liberated from the salt formed with the acetic or other acid liberated from the ester employed, for example by distillation with a caustic alkali, whereafter it may be returned for re-use in the process.

The base and acid may be recovered very efficiently from salts formed in the process of the present invention by a process such as that described in U. S. application S. No. 12,438 filed March 22nd, 1935, i. e., by thermally decomposing the salts and separating one from the other, the base and acid produced concurrently with their formation, or that described in U. S. application S. No. 41,868 filed September 24th, 1935, i. e., by subjecting the salt to distillation in the presence of a substance which is non-volatile under the conditions of the reaction and which forms with the organic acid, a compound which is stable at the temperature necessary to distil the salt under treatment and distil off the volatile base, but from which the acid can be subsequently recovered, e. g., by raising the temperature of distillation or by extraction with a suitable solvent.

When an amide is produced by the process of the present invention, for instance when the saponification is carried out with an organic amine under anhydrous conditions, the base and acid may be recovered similarly after first hydrolyzing the amide to produce the corresponding amine salt.

The following examples serve to illustrate the invention, but it is to be understood that these examples are given solely by way of illustration and are not in any way limitative.

*Example 1*

A mixture of vinyl acetate, pyridine and water in the approximate proportions by weight of 5 parts of vinyl acetate, 5 parts of pyridine and one of water, is heated to 100° C. in a vessel provided with a stirrer and a reflux condenser. The reflux condenser is maintained at room temperature or slightly higher, e. g., 20° C. so that substantially only the ethylene oxide produced escapes which can be condensed or absorbed.

*Example 2*

A mixture of vinyl acetate vapour and ammonia in the approximate proportions by weight of 5 parts of vinyl acetate to 1 part of ammonia is passed through a tube loosely filled with pieces of silica and maintained at a temperature of 245°–250° C.

Acetamide and unchanged vinyl acetate are condensed from the products issuing from the tube by cooling to about room temperature or slightly higher, e. g., 20° C., after which the ethylene oxide formed may be condensed.

In the following claims, the term "saponification" is used in its broad sense and in the absence of an expressed limitation in the claims it does not confine the process claimed to one in which the acid portion of the ester is recovered as a salt of the acid but includes, for instance, its recovery as an amide or as the free acid.

Having described my invention what I desire to secure by Letters Patent is:

1. Process for the production of an alkylene oxide, which comprises subjecting a fatty acid ester which is distillable and contains an α—β double bond in the alcohol radicle to the action of heat in the presence of a basic reagent and of not substantially more than one molecule of water per molecule of ester.

2. Process for the production of an alkylene oxide, which comprises subjecting a fatty acid ester which is distillable and contains an α—β double bond in the alcohol radicle to the action of heat in the presence of a nitrogen-containing base and not substantially more than one molecule of water per molecule of ester.

3. Process for the production of ethylene oxide, which comprises subjecting a distillable vinyl ester of a fatty acid to the action of heat in the presence of a nitrogen-containing base and not substantially more than one molecule of water per molecule of ester.

4. Process for the production of ethylene oxide, which comprises subjecting vinyl acetate to the action of heat in the presence of a nitrogen-containing base and not substantially more than one molecule of water per molecule of vinyl acetate.

5. Process for the production of ethylene oxide, which comprises subjecting vinyl acetate to the action of heat in the presence of a basic reagent and about one molecule of water per molecule of vinyl acetate.

6. Process for the production of ethylene oxide, which comprises subjecting vinyl acetate to the action of heat in presence of a basic reagent and in the substantial absence of water.

7. Process for the production of ethylene oxide, which comprises subjecting vinyl acetate to the action of heat in the presence of a nitrogen-containing base and not substantially more than one molecule of water per molecule of vinyl acetate.

8. Process for the production of ethylene oxide, which comprises subjecting vinyl acetate to the action of heat in the presence of a base containing the =NH group and in the substantial absence of water.

9. Process for the manufacture of ethylene oxide, which comprises subjecting to distillation a mixture of vinyl acetate, a nitrogen-containing base, and about one molecule of water per molecule of vinyl acetate, so as to produce and distil off ethylene oxide.

10. Process for the production of ethylene oxide, which comprises subjecting to the action of temperatures of 150 to 300° C. a vaporous mixture of vinyl acetate and a base containing the =NH group in the substantial absence of water.

HENRY DREYFUS.